United States Patent
Chang et al.

(10) Patent No.: US 8,392,701 B2
(45) Date of Patent: Mar. 5, 2013

(54) METHOD AND APPARATUS FOR ENSURING PACKET TRANSMISSION SECURITY

(75) Inventors: Xiangqing Chang, Beijing (CN); Wei Zheng, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 501 days.

(21) Appl. No.: 12/672,178

(22) PCT Filed: Jul. 22, 2008

(86) PCT No.: PCT/CN2008/071723
§ 371 (c)(1),
(2), (4) Date: Feb. 4, 2010

(87) PCT Pub. No.: WO2009/021428
PCT Pub. Date: Feb. 19, 2009

(65) Prior Publication Data
US 2011/0252228 A1      Oct. 13, 2011

(30) Foreign Application Priority Data
Aug. 16, 2007   (CN) .......................... 2007 1 0120365

(51) Int. Cl.
*H04L 9/00*     (2006.01)
(52) U.S. Cl. ........................................ 713/153; 713/150
(58) Field of Classification Search .................... 726/13, 726/14, 15; 713/150, 153, 161, 163, 168, 713/169; 308/282, 285, 270
See application file for complete search history.

(56) References Cited

U.S. PATENT DOCUMENTS

| | | | |
|---|---|---|---|
| 2002/0184487 A1* | 12/2002 | Badamo et al. | 713/153 |
| 2003/0212907 A1* | 11/2003 | Genty et al. | 713/201 |
| 2006/0005008 A1 | 1/2006 | Kao | |

FOREIGN PATENT DOCUMENTS

| | | |
|---|---|---|
| CN | 1529473 A | 9/2004 |
| CN | 1571399 A | 1/2005 |
| CN | 1852310 A | 10/2006 |
| CN | 1984131 A | 6/2007 |
| CN | 101106450 A | 1/2008 |

OTHER PUBLICATIONS

International Search Report: PCT/CN2008/071723.

* cited by examiner

*Primary Examiner* — Brandon Hoffman
*Assistant Examiner* — Nega Woldemariam
(74) *Attorney, Agent, or Firm* — Ladas & Parry LLP

(57) ABSTRACT

An apparatus and method for ensuring distributed packet transmission security are provided. In an embodiment of the present invention, a main control board allocates SA information to multiple processing boards according to a predefined criterion, so that each processing board which receives and stores the SA information may implement IPSec processing. As such, the IPSec processing is shared by the multiple processing boards. Accordingly, when there are a large number of IPSec tunnels on one interface, the IPSec processing to the packets passing the IPSec tunnels will not completely rely on only the processing board where the interface is located. Instead, the IPSec processing is allocated to different processing boards. Therefore, the multiple processing boards effectively share the IPSec processing corresponding to multiple SAs. The efficiency of the IPSec processing is increased.

21 Claims, 8 Drawing Sheets ion board is equipped with a functional unit for implementing the IPSec processing. Different interface units correspond to different IPSec tunnels. And the IPSec processing to the packets transmitted through different IPSec tunnels are performed on different interface boards, i.e. a distributed security protection is implemented.

SUMMARY OF THE INVENTION

Embodiments of the present invention provide an apparatus and method for ensuring distributed packet transmission security, which enable effectively sharing of IPSec processing and increase IPSec processing efficiency.

According to an embodiment of the present invention, an apparatus for ensuring packet transmission security is provided. The apparatus includes:

a main control board, at least one interface unit and at least one processing board, wherein the least one interface unit is adapted to forward at least one packet to the main control board;

the main control board is adapted to allocate, when receiving a packet forwarded by the at least one interface unit requiring Internet Protocol Security (IPSec) processing, one processing board of the at least one processing board to the packet, and forward the packet requiring the IPSec processing to the allocated processing board, wherein Security Association (SA) information related to an IPSec tunnel for transmitting the packet requiring the IPSec processing is stored in the processing board allocated; and the one of the at least one processing board is adapted to perform the IPSec processing to the packet requiring the IPSec processing received from the main control board according to the stored SA information.

According to another embodiment of the present invention, an apparatus for ensuring packet transmission security is provided. The apparatus includes:

a main control board, at least one interface unit and at least one processing board, wherein the at least one interface unit is adapted to forward at least one packet to the main control board;

the main control board is adapted to allocate one processing board of the at least one processing board to the packet when receiving the packet forwarded by the at least one interface unit, and forward the packet to the allocated processing board, wherein SA information stored by the processing board is related to an Internet Protocol Security (IPSec) tunnel transmitting the packet; and the one of the at least one processing board is adapted to perform IPSec processing to the packet received from the main control board according to the stored SA information.

According to another embodiment of the present invention, a main control board for ensuring packet transmission security is provided. The main control board includes: an allocation unit, adapted to allocate, when receiving from an interface unit a packet requiring Internet Protocol Security (IPSec) processing, one processing board of at least one processing board for the packet requiring the IPSec processing, and forward the packet requiring the IPSec processing to the allocated processing board, wherein the processing board stores Security Association (SA) information related to an IPSec tunnel for transmitting the packet requiring the IPSec processing.

According to another embodiment of the present invention, a method for ensuring packet transmission security is provided. The method is applied to an apparatus for ensuring packet transmission security comprising a main control board, at least one interface unit and at least one processing board, and includes:

when receiving a packet requiring Internet Processing Security (IPSec) processing forwarded by the interface unit, allocating by the main control board one of the at least one processing board to the packet requiring the IPSec processing;

forwarding by the main control board the packet requiring the IPSec processing to the allocated processing board, wherein Security Association (SA) information related to an IPSec tunnel for transmitting the packet requiring the IPSec processing is stored in the allocated processing board; and performing, by the allocated processing board, the IPSec processing to the packet received from the main control board according to the stored SA information.

As can be seen from the above technical solution, the main control board establishes an SA, and allocates SA information obtained from the establishment of the SA to different processing boards according to a pre-defined rule. The interface unit firstly transmits packets received to the main control board. The main control board allocates the packets equally to the processing boards for IPSec processing according to a pre-defined rule. Therefore, in the technical solution of the present invention, as the establishment of the SA, the allocation of the SA information and the allocation of the packets during IPSec processing are controlled by the main control board, the binding between the interface unit and the processing board in the prior art is broken. The packets transmitted through IPSec of one interface unit are not restricted to be processed on the processing board where the interface unit is located any more. Instead, they may be allocated by the main control board to be processed by any processing board according to the pre-defined rule. Therefore, when there are a large number of IPSec tunnels on one interface unit, the IPSec processing of the packets passing the IPSec tunnels will not rely on only one the processing board where the interface board is located, but are allocated to different processing boards. Thus, multiple processing boards effectively share the IPSec processing corresponding to multiple SAs. And the efficiency of the IPSec processing is increased.

DETAILED DESCRIPTION OF THE INVENTION

The present invention will be described hereinafter in detail with reference to embodiments and accompanying drawings to make the technical solution and merits therein.

Figure 1:
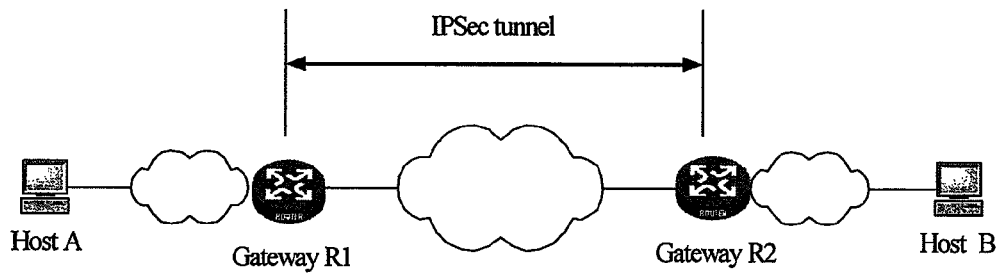
FIG. 1 is a schematic diagram illustrating an IPSec tunnel networking model.
Figure 2:
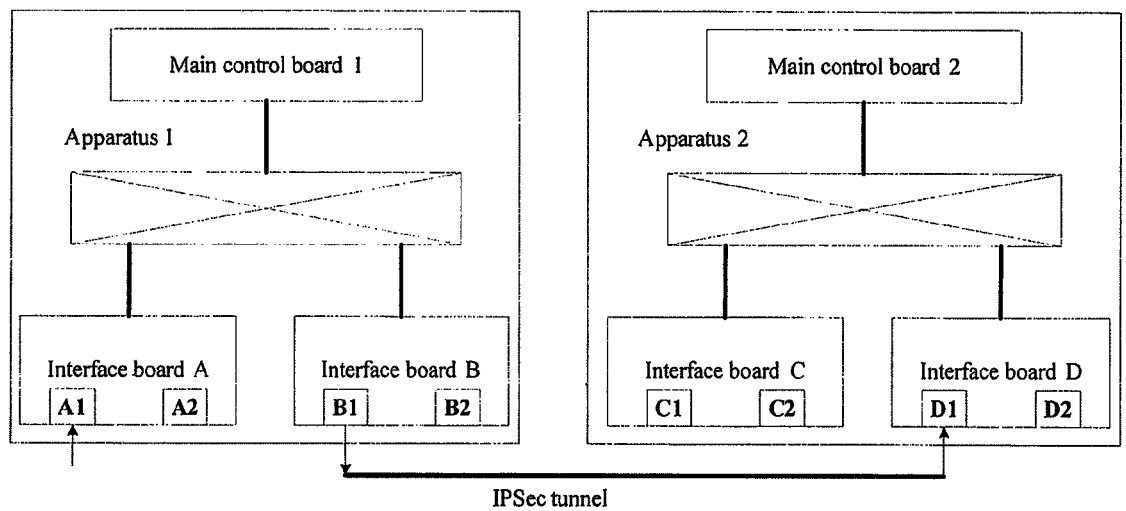
FIG. 2 is a schematic diagram illustrating structures of apparatuses for ensuring distributed packet transmission security in an IPSec tunnel networking model according to an embodiment of the present invention.

FIG. 2 is a schematic diagram illustrating apparatuses for ensuring distributed packet transmission security in an IPSec tunnel networking model, wherein internal structures of two apparatuses for ensuring packet transmission security are illustrated. Apparatus 1 functions as R1 in FIG. 1 and apparatus 2 functions as R2 in FIG. 1. As shown in FIG. 2, the apparatus 1 includes at least: a main control board 1, an interface board A and an interface board B. The main control board 1 is connected respectively with the interface board A and the interface board B through a switch network. Two interface units A1 and A2 are set on the interface board A, and two interface units B1 and B2 are set on the interface board B. The apparatus 2 includes at least: a main control board 2, an interface board C and an interface board D. The main control board 2 is connected respectively with the interface board C and the interface board D through a switch network. Two interface units C1 and C2 are set on the interface board C and two interface units D1 and D2 are set on the interface board D.

The working principle of the apparatuses 1 and 2 will be described hereinafter with reference to examples.

As to an ingress direction, it is supposed that the interface unit A1 on the interface board A of the apparatus 1 receives an ingress packet. The interface board A searches a forwarding table. If it is determined that the ingress packet should be transmitted out from the interface unit B1 of the interface board B, the interface board A forwards the ingress packet to the interface board B.

At this time, if an SA has not been established on the apparatus 1, the interface board B discards the ingress packet received from the interface board A and requests the main control board to establish an SA. After initiating an IKE negotiation and establishing the SA, the main control board transmits corresponding ingress SA information to the interface board B, so that the interface board B can perform ingress IPSec processing when receiving an ingress packet next time. If an SA has already been established on the apparatus 1, the interface board B performs the ingress IPSec processing, such as encrypting, to the ingress packet received from the interface board A according to stored ingress SA information and transmits the processed packet to a corresponding IPSec tunnel through the interface unit B1.

As to an egress direction, it is supposed that the interface unit D1 on the interface board D of the apparatus 2 receives from the IPSec tunnel an egress packet, i.e. the packet transmitted by the apparatus 1 through the interface unit B1 and the IPSec tunnel corresponding to the interface unit B1. If an SA has not been established on the apparatus 2, the interface board D discards the packet and requests the main control board 2 to establish an SA. After initiating an IKE negotiation and establishing the SA, the main control board 2 transmits corresponding egress SA information to the interface board D. If an SA has already been established on the apparatus 2, the interface board D performs egress IPSec processing, such as decrypting, to the packet received from the IPSec tunnel according to the stored egress SA information.

Similarly, other interface units on the apparatuses 1 and 2 correspond to other IPSec tunnels, and they may perform IPSec processing to ingress or egress packets according to the above principle.

The inventor of the present invention finds that, in the apparatuses shown in FIG. 2, when an IPSec tunnel corresponding to an interface unit needs to transmit an ingress or egress packet, the corresponding IPSec processing may be performed only by the interface board where the interface unit is located, i.e. the IPSec processing is allocated according to interfaces. However, in some network scenarios, when an interface unit has a large number of IPSec tunnels, all the IPSec processing to the packets passing the IPSec tunnels rely on only one interface board, which dramatically decreases the efficiency of the IPSec processing.

Take the apparatus for ensuring distributed packet transmission security as shown in FIG. 2 as an example. The interface unit A1 on the interface board A of the apparatus 1 successively receives multiple ingress packets. The interface board A searches the forwarding table. If it is determined that each of the ingress packets needs to be transmitted out through the interface unit B1 of the interface board B, the interface board A forwards the multiple successively-received ingress packets to the interface board B. If an SA has been established on the apparatus 1, the interface board B performs ingress IPSec processing to the multiple ingress packets received while the interface board A is idle at this moment.

The interface board B transmits the processed packets to the IPSec tunnel through interface unit B1, wherein a peer interface of the IPSec tunnel is the interface unit D1 on the interface board D of the apparatus 2. The interface unit D1 on the interface board D of the apparatus 2 receives the egress packets from the IPSec tunnel. If an SA has been established on the apparatus 2, the interface board D performs egress IPSec processing to the packets received from the IPSec tunnel according to the stored egress SA information, while the interface board C is idle at this moment.

Therefore, the inventor of the present invention provides the following solution to solve the above problem that loads are unbalanced among the processing boards and that low efficiency of the IPSec processing is thus low.

In the embodiments of the present invention, the main control board does not always transmit the SA information corresponding to the IPSec tunnel of each interface unit to the processing board of the interface unit. Instead, according to a load-balancing principle, the SA information established with respect to the IPSec tunnel of each interface unit is respectively transmitted to a relatively-idle processing board according to a service processing situation of each processing board. Each interface unit transmits the packet received to the main control board. When determining that the packet requires IPSec processing, the main control board transmits the SA information corresponding to the packet to a relatively-idle processing board which performs corresponding IPSec processing to the subsequently-transmitted packet. Alternatively, the main control board allocates the SA information to the processing boards in average according to a pre-defined criterion. After determining that a packet transmitted from an interface unit requires the IPSec processing, the main control board allocates the packet to the processing board which stores SA information corresponding to packet characteristic of the packet. The processing board performs the IPSec processing to the packet. In the embodiments of the present invention, through allocating the SA information corresponding to the processing boards, the load of the processing boards is balanced.

As such, when an interface unit has a large number of IPSec tunnels, the IPSec processing of the IPSec tunnel packets will not rely only on the processing board where the interface unit is located. Instead, the IPSec processing is allocated to different processing boards for processing. Thus, the processing boards effectively share the IPSec processing and the efficiency of the IPSec processing is increased.

The processing board may be a processing board where the interface unit is located, i.e. the interface board. Since the apparatus for ensuring distributed packet transmission security generally includes a service board for performing service processing such as session service processing, the above processing board may also be the service board. In practical applications, it is only required to add a functional unit for performing the IPSec processing on the service board.

Figure 3:
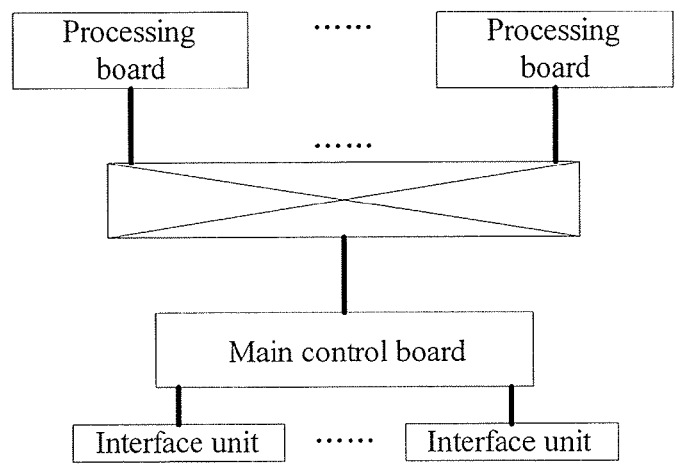
FIG. 3 shows an exemplary structure of an apparatus for ensuring distributed packet transmission security according to an embodiment of the present invention.

FIG. 3 is a schematic diagram illustrating an exemplary structure of an apparatus for ensuring distributed packet transmission security. As shown in FIG. 3, the apparatus in this embodiment may include: a main control board, interface units and processing boards.

The main control board is adapted to establish an SA with respect to an IPSec tunnel on each interface unit, and transmit SA information obtained from the establishment of the SA to each processing board according to a pre-defined criterion, e.g. allocate the SA information to each processing board according to a balance-based algorithm such as polling, Hash, etc. The processing boards store the SA information received.

The interface unit is adapted to transmit a received packet to the main control board. The main control board transmits the packet which requires IPSec processing to a processing board which stores the SA information corresponding to the packet characteristic of the packet.

Generally, the SA information includes: an Access Control List (ACL) rule number, interface index, tunnel peer IP, AS protected flow quintuplet. Therefore, the main control board may obtain the corresponding packet characteristic from the packet and find the SA information matching the packet characteristic of the packet received.

In practical applications, the main control board also stores a pre-defined security policy. The security policy defines security services (including security protocol type, encryption/authentication algorithm and encapsulation mode) corresponding to different packets. The security policy also includes an ACL rule table describing the packet characteristic of the packet. The ACL rule table includes: quintuplet information (including source/destination IP, source/destination port number, and protocol type born by an IP layer) of a packet flow protected by the security policy, and the processing (applying the IPSec protection or discarding) which should be performed to the packet. All the packets within the quintuplet of the ACL rule table are processed according to a manner defined in the ACL rule table. The security policy further includes an ingress SA index and an egress SA index which are allocated by the main control board. Each SA is uniquely corresponding to one SA index. After receiving a packet, the main control board determines whether the IPSec processing should be applied to the packet according to the stored security policy. If the interface unit determined by searching the forwarding table according to the destination IP address of the packet enables the IPSec, the main control board compares the quintuplet of the packet with the security policy configured on the interface. If the comparing result indicates that the IPSec processing should be performed to the packet, the main control board finds the corresponding SA and transmits the packet to the processing board which stores the corresponding SA information. Different interface units may be configured with the same security policy or different security policies.

The processing board performs the IPSec processing to the packet received from the main control board according to the stored SA information.

Furthermore, the processing board transmits the processed packet to the main control board. The main control board searches a forwarding table to forward the packet from the processing board to an interface unit which is used for transmitting the packet out.

As to the packet needs to be transmitted through the IPSec tunnel, the IPSec processing includes encryption and encapsulation processing. As to the packet received from the IPSec tunnel, the IPSec processing includes decryption and de-capsulation processing. If the processing board stores multiple pieces of SA information, it is also possible for the processing board to select one piece of matching SA information according to the packet characteristic of the packet and perform the IPSec processing to the packet according to the matching SA information.

It can be seen from the above apparatus that, the main control board allocates the SA information to multiple processing boards according to the pre-defined criterion. Thus, each processing board which receives and stores the SA information may implement the IPSec processing. Accordingly, the IPSec processing is shared by multiple processing boards. Therefore, when there are a large number of IPSec tunnels on a same interface, the IPSec processing to the packets passing the IPSec tunnels is not necessarily rely on one processing board. But instead, the IPSec processing may be performed by different processing boards through allocating the packets to different processing boards. As such, the multiple processing boards effectively share the IPSec processing corresponding to the multiple SAs and the efficiency of the IPSec processing is increased.

In practical applications, the main control board and the processing board may be connected through a switch network. The interface unit may be a physical interface on the main control board or a physical interface on the processing board or a functional unit independent from the main control board or the processing board. The interface unit may be connected with the main control board through the switch network or be connected with the processing board through a switch network and connected with the main control board through the processing board via another switch network.

In the apparatus for ensuring the distributed packet transmission security provided by the embodiments of the present invention, the main control board, the processing board and the interface unit may be located in a same physical entity. Or, any two of the main control board, the processing board and the interface unit are located in different physical entities.

After finishing the corresponding IPSec processing, the processing board transmits the processed packet to the main control board. The main control board transmits the packet from the processing board via a corresponding interface unit to implement the transmission of the packet.

The apparatus for ensuring the packet transmission security shown in FIG. 3 may be a gateway.

Figure 4:
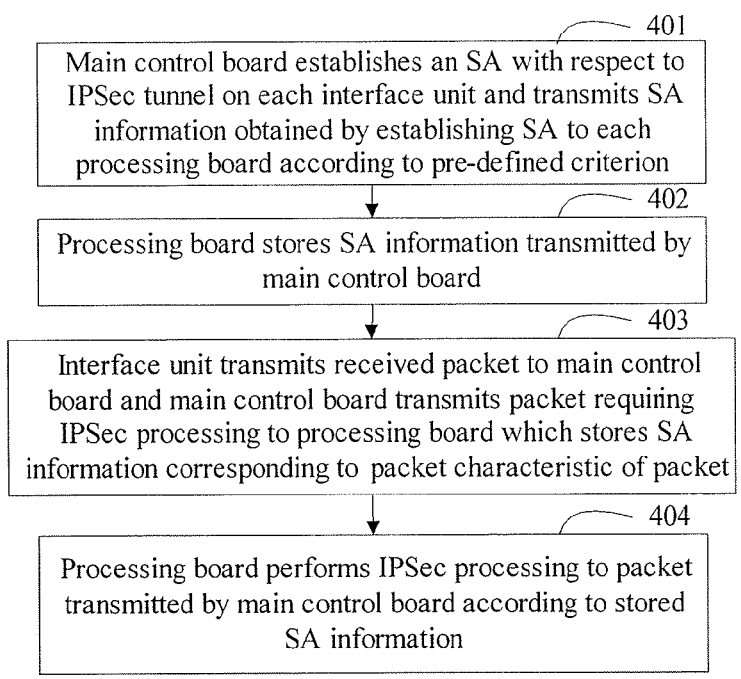
FIG. 4 is a flowchart illustrating a method for ensuring distributed packet transmission security according to an embodiment of the present invention.

FIG. 4 is a flowchart illustrating an exemplary method for ensuring distributed data transmission security according to an embodiment of the present invention. As shown in FIG. 4, the method for ensuring the distributed packet transmission security according to this embodiment of the present invention includes:

Step 401, the main control board establishes an SA with respect to the IPSec tunnel on each interface unit and transmits SA information obtained by establishing the SA to each processing board according to a pre-defined criterion.

Step 402, the processing board stores the SA information transmitted by the main control board.

Step 403, an interface unit transmits a received packet to the main control board. The main control board transmits the packet which requires IPSec processing to a processing board which stores SA information corresponding to the packet characteristic of the packet.

In this step, after receiving the packet, the main control board may firstly determine whether the packet received requires the IPSec processing according to the stored security policy. If it is determined to perform the IPSec processing to the packet, proceed to this step; otherwise, terminate the procedure, discard the packet or forward the packet through other routing forwarding manners. In some specific situations, if only the packets require the IPSec processing are transmitted, it is also possible to omit the step of determining whether the packet requires the IPSec processing.

In this step, an SA index may be obtained from the security policy and transmitted to the processing board together with the packet.

Step 404, the processing board performs the IPSec processing to the packet transmitted by the main control board according to the stored SA information.

In this step, as to the packet needs to be transmitted through the IPSec tunnel, the IPSec processing includes encryption and encapsulation processing. As to the packet received from the IPSec tunnel, the IPSec processing includes decryption and de-capsulation processing. If the processing board stores multiple pieces of SA information, it is also possible for the processing board to select one piece of matching SA information according to the packet characteristic of the packet and perform the IPSec processing to the packet according to the matching SA information.

In this step, the processing board may also select the corresponding SA information according to the SA index transmitted by the main control board.

It can be seen from the above that, the main control board allocates the SA information to multiple processing boards according to the pre-defined criterion. Thus each the processing boards which receives and stores the SA information may implement the IPSec processing. Accordingly, the IPSec processing is shared by multiple processing boards. Therefore, when there are a large number of IPSec tunnels on a same interface, the IPSec processing to the packets passing the IPSec tunnels is not necessarily rely on one processing board. But instead, the IPSec processing may be performed by different processing boards through allocating the packets to different processing boards. As such, the multiple processing board effectively share the IPSec processing corresponding to the multiple SAs and the efficiency of the IPSec processing is increased.

After step 404, the processing board may transmit the processed packet to the main control board. The main control board transmits the packet from the processing board via a corresponding interface unit to implement the transmission of the packet.

In the embodiments of the present invention, considering an anti-replay feature of the IPSec, all the IPSec processing corresponding to a same ingress SA or a same egress SA should be allocated to a same processing board.

For example, in the ingress direction, if the IPSec processing corresponding to the same SA is allocated to different processing boards, the packets processed by the two processing boards may have the same sequence number due to the asynchronous of the sequence numbers, which violates the feature that packet sequence numbers corresponding to the same SA should be monotonically increasing. In the egress direction, if the IPSec processing corresponding to the same SA is allocated to different processing boards, anti-replay windows corresponding to the same SA on the two processing boards have different positions, which make the packet received from the egress direction discarded in error.

Therefore, in the embodiments of the present invention, the main control board transmits the same SA information to only one processing board but not multiple processing boards. Before allocating different SA information to different processing boards, a relocation table is created and stored according to different SA information. Then according to the created and stored relocation table, all subsequently-received packets which require the IPSec processing and whose packet characteristic correspond to the same SA information will be transmitted to the same processing board for corresponding IPSec processing.

Hereinafter, the relocation table in the embodiments of the present invention will be described in detail.

In this embodiment, the created relocation table includes: an ingress relocation table created according to different ingress SA information and an egress relocation table created according to different egress SA information.

If a packet received by the main control board through at least one interface unit is an ingress packet, the main control board searches the relocation table created according to the ingress SA information, and transmits the ingress packet to a processing board which stores the ingress SA information according to a searching result.

If the packet received by the main control board through the at least one interface unit is an egress packet, the main control board searches the relocation table created according to the egress SA information, and transmits the egress packet to a processing board which stores the egress SA information according to a searching result.

The ingress relocation table may be as shown in table 1.

TABLE 1

| Keyword(Key) | Searching result(Result) |
|---|---|
| Source IP(SrcIP) | Relocation processing board number (SlotNo) |
| Destination IP(DstIP)or tunnel peer IP | |
| Source port(SrcPort) | |
| Destination port(DstPort) | |
| Protocol type(Protocol) | |
| Interface index(Ifindex) | |

In the ingress relocation table shown in table 1, the ingress packet characteristic is taken as keywords, including quintuplet information (source IP, destination IP, source port, destination port, protocol type) and an interface index applying the IPSec processing, wherein the destination IP may be replaced by a tunnel peer IP. The searching result is an identifier such as the processing board number corresponding to the ingress packet characteristic.

Generally, the SA information includes: ACL rule number, interface index, tunnel peer IP, SA protected flow quintuplet. Therefore, the main control board may obtain the corresponding keywords from the above information.

In practical applications, the keywords may not include all the quintuplet information and the interface index but includes only anyone or any combination of the quintuplet information and the interface index.

After the ingress SA is established, the main control board can obtain the ingress packet characteristic from the ingress SA information, take the ingress packet characteristic as the keywords and determine a processing board identifier corresponding to the keywords, i.e. establish a relocation table similar to table 1, and transmit the ingress SA information corresponding to the relocation table to the processing board corresponding to the processing board identifier.

If the processing board identifier is the processing board number, (the number of relocation tables currently established) mod (the number of the processing boards)=a mod result. The processing board number, i.e. the processing board number corresponding to different ingress SAs, in each ingress relocation table is determined according to the mod result, so as to equally allocate the IPSec processing corresponding to different SAs to all the processing boards.

Suppose the number of the processing boards is 10 and the currently-established relocation table is the first relocation table established, i.e. the number of the relocation tables is 1. The mod of 1 to 10 (i.e. the remainder of dividing 1 by 10) is 1. It is determined that the processing board number in the first relocation table is 1 according to the mod result.

Similarly, each time a relocation table is established, the processing board number in the relocation table is determined according to the above formula. Suppose the currently established relocation table is the $53^{th}$ relocation table, i.e. the number of the relocation tables is 53. The mod of 53 to 10 (i.e. the remainder of dividing 53 by 10) is 3. Then it is determined that the processing board number in the $53^{th}$ relocation table is 3 according to the mod result.

As can be seen, in case that there are 10 processing boards, the processing board number in the relocation table is the ones place of i, and thereby the IPSec processing corresponding to different SAs are equally allocated to all the processing boards.

In practical applications, other manners such as random allocation may also be adopted to determine the processing board identifier in each ingress relocation table so as to allocate the IPSec processing corresponding to all ingress SAs to all the processing boards as equally as possible.

As such, after the ingress packet is received via the interface unit subsequently, the ingress packet characteristic may be directly or indirectly obtained from the ingress packet. The corresponding processing board identifier may be obtained through searching the ingress relocation table according to the ingress packet characteristic. Then the packet will be transmitted to the processing board corresponding to the processing board identifier.

In practical applications, different ingress packet characteristics may be taken as the keywords to establish the ingress relocation table. Then the corresponding ingress packet characteristic is obtained from the ingress packet received, a corresponding ingress table is found and the ingress packet is transmitted to the processing board which stores the corresponding SA information. That is to say, in the embodiments of the present invention, different methods may be adopted to allocate the IPSec processing corresponding to different SAs to different processing boards.

In the above technical solution, different ingress relocation tables are established with respect to different ingress packet characteristics. In practical applications, it is also possible to configure only one ingress relocation table and create different items in the ingress relocation table with respect to different ingress packets. In this situation, it is possible to calculate the mod of the number of items in the relocation table to the number of the processing boards and determine a processing board number corresponding to each item according to the mod result.

Hereinafter, the allocation of the IPSec processing based on different methods and the establishment of the corresponding ingress relocation table will be described in detail.

In the embodiments of the present invention, the IPSec processing may be relocated based on the following four manners: allocation based on the ACL rule, allocation based on the interface index, allocation based on tunnel peer IP, and allocation based on the SA protected flow quintuplet.

Figure 5:
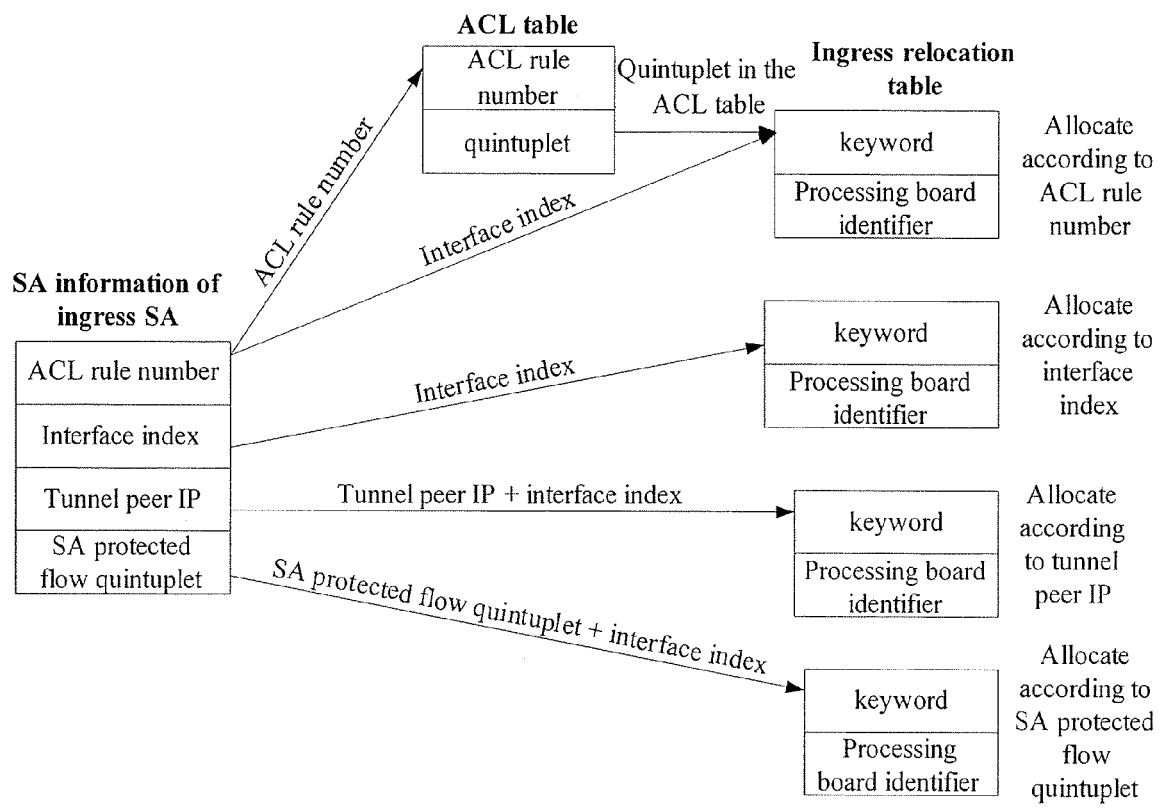
FIG. 5 is a schematic diagram illustrating establishment of an ingress relocation table according to an embodiment of the present invention.

FIG. 5 is a schematic diagram illustrating establishment of an ingress relocation table according to an embodiment of the present invention.

As shown in FIG. 5, if the allocation is based on the ACL rule, i.e. the main control board allocates the IPSec processing corresponding to different SAs to different processing boards according to the ACL rule cited in the IPSec security policy, the main control board obtains the ACL rule number in the ingress SA information and searches the ACL table according to the ACL rule number to obtain the quintuplet information protected by the ACL rule, then obtains the quintuplet and the interface index in the SA information as the keywords of the ingress relocation table. The processing board identifier which is the searching result may be determined according to a pre-defined rule. Take the processing board number as an exemplary processing board identifier, it is possible to determine the processing board number according to the mod of the number of the ingress relocation tables to the number of the processing boards. The processing board number may also be determined randomly.

Thus, in the established ingress relocation table, the ingress packet characteristic used as the keywords includes: the ACL rule number in the corresponding ingress SA information, the quintuplet found from the pre-configured ACL table, and the interface index in the ingress SA information.

As shown in FIG. 5, if the allocation is based on the interface index, i.e. the main control board allocates the IPSec processing corresponding to different SAs to different processing boards according to different interface indexes, the main control boards obtains the interface index in the ingress SA information and takes the interface index as the keyword of the ingress relocation table. As to the processing board identifier used as the searching result, take the processing board number as an example, it is possible to determine the processing board number according to the mod of the number of the ingress relocation tables to the number of the processing boards. It is also possible to determine the processing board number randomly.

Thus, in the established ingress relocation table, the ingress packet characteristic used as the keyword includes: the interface index in the corresponding ingress SA information.

As shown in FIG. 5, if the allocation is based on the tunnel peer IP, i.e. the main control board allocates all the ingress packets having the same tunnel peer IP to the same processing board, the main control board obtains the tunnel peer IP and the interface index in the ingress SA information and takes them as the keywords of the ingress relocation table. As to the processing board identifier used as the searching result, it may be determined according to a pre-configured rule. Take the processing board number as an exemplary processing board identifier, it is possible to determine the processing board number according to the mod of the number of the ingress relocation tables to the number of the processing boards. It is also possible to determine the processing board number randomly.

As to the allocation based on the tunnel peer IP, if there are multiple IPSec tunnels between local side and peer side, all the ingress packets transmitted through the IPSec tunnels should be processed by one processing board. If the local side has IPSec tunnels respectively with multiple peer sides, all the ingress packets transmitted through the IPSec tunnels should be allocated to multiple processing boards for processing, wherein the ingress packets transmitted through the IPSec tunnels between the local side and a same peer side are processed by a same processing board.

Thus, in the established ingress relocation table, the ingress packet characteristic used as the keywords includes: the tunnel peer IP and the interface index in the corresponding ingress SA information.

As shown in FIG. 5, if the allocation is based on SA protected flow quintuplet, i.e. a same SA only corresponds to the packets of a single data flow, the main control board obtains the SA protected flow quintuplet and the interface index in the ingress SA information and takes them as the keywords of the ingress relocation table. As to the searching result, the processing board number is taken as an exemplary processing board identifier. Thus, it is possible to determine the processing board number according to the mod of the number of the ingress relocation tables to the number of the processing boards. It is also possible to determine the processing board number randomly.

Thus, in the established ingress relocation table, the ingress packet characteristic used as the keywords includes: the SA protected flow quintuplet and the interface index in the corresponding SA information.

In practical applications, different allocation manners may be selected to establish the corresponding ingress relocation table according to the required load sharing granularity. The allocation of the IPSec processing according to the interface index is to allocate all the ingress IPSec processing which should be performed to all the packets on a same interface to a same processing board. Therefore, the granularity of this manner is the largest. The allocation based on the SA protected flow quintuplet is to allocate the ingress IPSec processing of all the ingress packets corresponding to one data flow to one processing board. Therefore, the granularity of this manner is the smallest.

With respect to the above manners for allocating the IPSec processing and the above established ingress relocation tables, the main control board may obtain the corresponding ingress packet characteristic directly or indirectly from the ingress packet received and take the ingress packet characteristic as the keywords to find the corresponding processing board identifier from the ingress relocation table.

Figure 6:
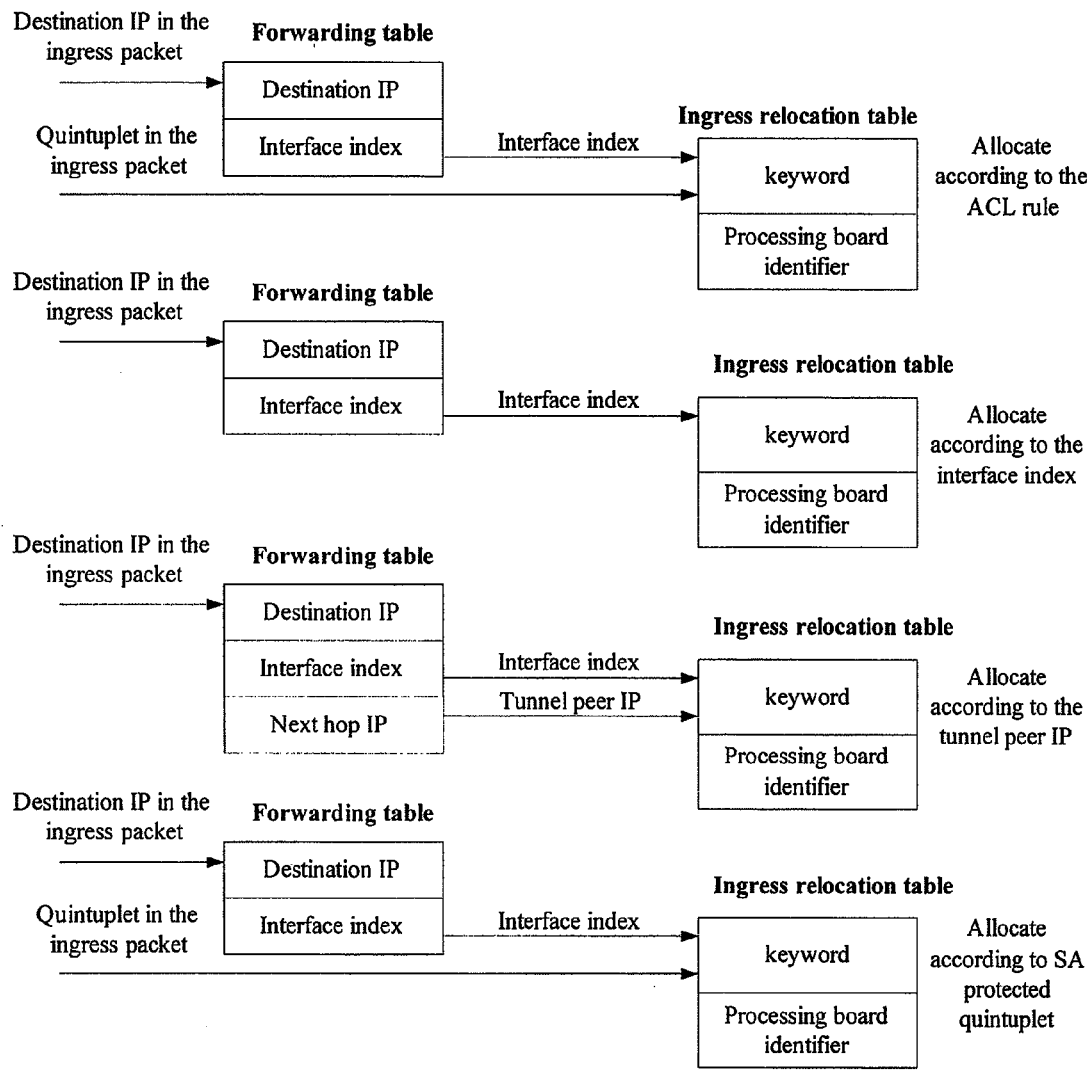
FIG. 6 is a schematic diagram illustrating an ingress relocation procedure according to an embodiment of the present invention.

FIG. 6 is a schematic diagram illustrating an ingress relocation procedure according to an embodiment of the present invention.

As shown in FIG. 6, if the allocation manner of the IPSec processing corresponding to the established ingress relocation table is based on the ACL rule, the main control board searches a pre-defined forwarding table according to a destination IP in the ingress packet received by the interface unit to determine an interface index corresponding to the ingress packet. Then the main control board searches the ingress relocation table according to the quintuplet of the ingress packet and the interface index corresponding to the ingress packet to obtain the processing board identifier in the ingress relocation table, and transmits the ingress packet to the processing board corresponding to the processing board identifier.

In practical applications, the main control board may also not obtain all elements of the quintuplet of the ingress packet, but obtain only any one or some elements. According to the one or some elements obtained and the interface index corresponding to the ingress packet, the main control board may also obtain the corresponding processing board identifier through searching the ingress relocation table.

As shown in FIG. 6, if the allocation manner of the IPSec processing corresponding to the established ingress relocation table is based on interface index, the main control board searches the pre-defined forwarding table according to the destination IP in the ingress packet received by the interface unit to determine the interface index corresponding to the ingress packet, then searches the ingress relocation table according to the interface index corresponding to the ingress packet received to find an item whose keyword is consistent with the interface index corresponding to the ingress packet, so as to obtain the corresponding processing board identifier in the ingress relocation table, and then transmits the ingress packet to the processing board corresponding to the processing board identifier.

As shown in FIG. 6, if the allocation of the IPSec processing corresponding to the established ingress relocation table is based on the tunnel peer IP, the main control board searches the pre-defined forwarding table according to the destination IP of the ingress packet received by the interface unit to determine the interface index corresponding to the ingress packet and a next hop IP of the ingress packet, searches the ingress relocation table according to the interface index and the next hop IP corresponding to the ingress packet to obtain the corresponding processing board identifier in the ingress relocation table, and then transmits the ingress packet to the processing board corresponding to the processing board identifier.

The next hop IP corresponding to the ingress packet may be deemed as the peer IP of the IPSec tunnel. Take the IPSec tunnel networking model shown in FIG. 1 as an example, the ingress packet is transmitted from host A to host B. The destination IP of the ingress packet is the IP address of host B. As to R1, the tunnel peer IP is the IP address of R2. Therefore, the next hop IP found by R1 from the forwarding table is the IP address of R2.

As shown in FIG. 6, if the allocation of the IPSec processing corresponding to the established ingress relocation table is based on the SA protected flow quintuplet, the main control board searches the pre-defined forwarding table according to the destination IP of the ingress packet received by the interface unit to determine the interface index corresponding to the ingress packet, searches the ingress relocation table according to the quintuplet of the ingress packet and the interface index corresponding to the ingress packet to obtain the corresponding processing board identifier in the ingress relocation table, and then transmits the ingress packet to the processing board corresponding to the processing board identifier. The quintuplet of the ingress packet may correspond to the SA protected flow quintuplet.

In practical applications, the main control board may also not obtain all elements of the quintuplet of the ingress packet, but obtain only any one or some elements. According to the one or some elements obtained and the interface index corresponding to the ingress packet, the main control board may also obtain the corresponding processing board identifier through searching the ingress relocation table.

It can be seen from the above that, different manners may be selected to establish the ingress relocation table according to the required load sharing granularity. Then according to the established ingress relocation table, the ingress packets may be allocated to different processing boards for corresponding IPSec processing, so as to implement various IPSec processing allocation manners and increase the flexibility and universality of the technical solution of the present invention.

When the ingress relocation is established, an egress relocation table is established at the same time. In this embodiment, the egress relocation table may be shown as table 2.

TABLE 2

| Keyword(Key) | Searching result (Result) |
|---|---|
| Security Parameter Index (SPI) Source IP (SrcIP) Protocol type (Protocol) | Relocation processing board number (SlotNo) |

In the egress relocation table shown in table 2, the egress packet characteristic used as the keywords may include: security parameter index, tunnel local IP and security protocol type.

Generally, an egress SA is uniquely identified by a triplet which includes: Security Parameter Index (SPI), destination IP and security protocol type. Therefore, the main control board may obtain the SPI, the security protocol type and the destination IP which is corresponding to the tunnel local IP from the above information After the egress SA is established, the main control board is able to obtain the corresponding egress packet characteristic from the egress SA information, take the egress packet characteristic as the keywords and determine the processing board identifier corresponding to the keyword, i.e. establish a relocation table similar to that shown in table 2, and transmit the egress SA information corresponding to the establishment of the relocation table to the processing board corresponding to the processing board identifier.

If the processing board identifier is the processing board number, it is possible to calculate a mod of the number of the egress relocation tables to the number of the processing boards, and determine a processing board number in each egress relocation table according to the mod result. It is also possible to determine the processing board number according to other manners such as random allocation, so as to allocate the IPSec processing corresponding to all the egress SAs to all the processing boards as equally as possible.

However, data flows such as sessions are bidirectional. Therefore, in order to avoid the problem such as complex status synchronization and large system bandwidth occupation when processing the bidirectional data flow born by the IPSec tunnel, the IPSec processing corresponding to a pair of ingress SA and egress SA which are correlated to each other is allocated to the same processing board in this embodiment.

In other words, an ingress relocation table may be established firstly according to the ingress SA, and then the processing board identifier in the ingress relocation table is taken as the processing board identifier in a corresponding egress relocation table.

Thus, when an egress packet is received via the interface unit subsequently, it is possible to obtain the corresponding egress packet characteristic from the egress packet, search the egress relocation table according to the obtained egress packet characteristic to determine the corresponding processing board identifier, and transmit the egress packet to the processing board corresponding to the processing board identifier. In addition, if the processing board identifier in the ingress relocation table established according to the ingress SA is the same as that in the egress relocation table established according to the egress SA, it is ensured that the IPSec processing corresponding to the ingress SA and the egress SA which are correlated to each other is allocated to the same processing board, thereby solving the problem of complex status synchronization and large system bandwidth occupation when bidirectional data flows born by the IPSec tunnel is processed.

At this time, the searching result of the egress relocation table may further include an egress SA index. After searching the egress relocation table according to the egress packet characteristic, it is possible to transmit the egress packet and the egress SA index to the processing board identified by the processing board identifier found. The processing board searches the egress SA information stored by the processing board according to the egress SA index and performs IPSec processing to the egress packet according to the egress SA information found.

Figure 7:
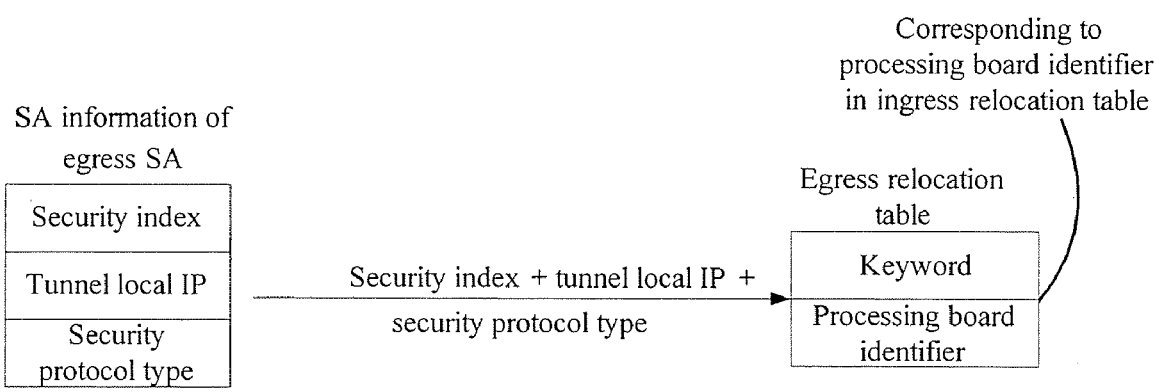
FIG. 7 is a schematic diagram illustrating establishment of an egress relocation table according to an embodiment of the present invention.

FIG. 7 is a schematic diagram illustrating establishment of an egress relocation table according to an embodiment of the present invention. As shown in FIG. 7, a security index, a tunnel local IP and a security protocol type are obtained from the egress SA information and are taken as keywords of the egress relocation table. The processing board identifier in the corresponding ingress relocation table is taken as the processing board identifier of the egress relocation table.

Figure 8:
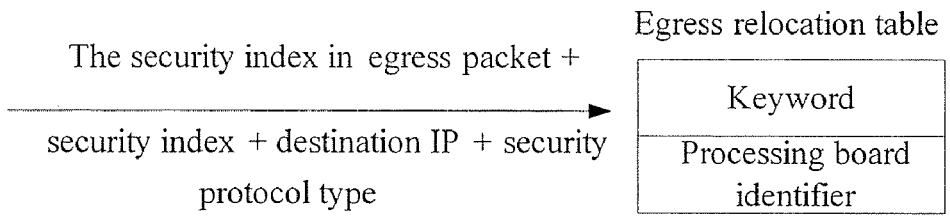
FIG. 8 is a schematic diagram illustrating an egress relocation procedure according to an embodiment of the present invention.

FIG. 8 is a schematic diagram illustrating an egress relocation procedure according to an embodiment of the present invention. As shown in FIG. 8, the main control board obtains the security index, destination IP and the security protocol type from the egress packet received by the interface unit, takes the egress packet characteristic as keywords, searches the egress relocation table to determine the corresponding processing board identifier, and transmits the egress packet to the processing board corresponding to the processing board identifier.

Thus, because the ingress relocation table ensures that the ingress IPSec processing corresponding to the same ingress SA is allocated to the same processing board, the processing board identifier acting as a searching result in the ingress relocation table can be copied to a searching result item in the corresponding egress relocation table, and it is thus ensured that the egress IPSec processing corresponding to the same egress SA correlated with the above ingress SA is allocated to the same processing board.

In practical applications, the egress SA information also includes the interface index, the ACL rule number, the tunnel peer IP and the SA protected flow quintuplet, which are the same as those in the ingress SA information. Therefore, in this embodiment, according to different load sharing granularity, any one or any combination of the interface index, the ACL rule number, the tunnel peer IP and the SA protected flow quintuplet may be selected as the keywords in the ingress relocation table.

It can be seen from the above that, different manners may be selected to establish the ingress relocation table according to the required load sharing granularity. Then according to the established ingress relocation table, the ingress packets, may be allocated to different processing boards for corresponding IPSec processing, so as to implement various IPSec processing allocation manners and increase the flexibility and universality of the technical solution of the present invention.

In addition, the above embodiment also ensures that the service board identifiers in the ingress relocation table and the egress relocation table corresponding respectively to a pair of correlated ingress SA and egress SA are the same, which further ensures that the IPSec processing corresponding to the pair of correlated ingress SA and the egress SA is allocated to the same processing board. Thus, the problem of complex status synchronization and large system bandwidth occupation when the bidirectional data flow born by the IPSec tunnel is processed may be solved.

In the above technical solution, different egress relocation tables are established with respect to different egress packet characteristics. In practical applications, it is also possible to establish only one egress relocation table and establish different items in the egress relocation table with respect to different egress packets.

The above describes the apparatus and method for ensuring packet transmission security, the establishment of the relocation table and the packet relocation procedure according to the embodiments of the present invention. Hereinafter, the above technical solution will be described as a whole with reference to a packet transmission instance.

Figure 9:
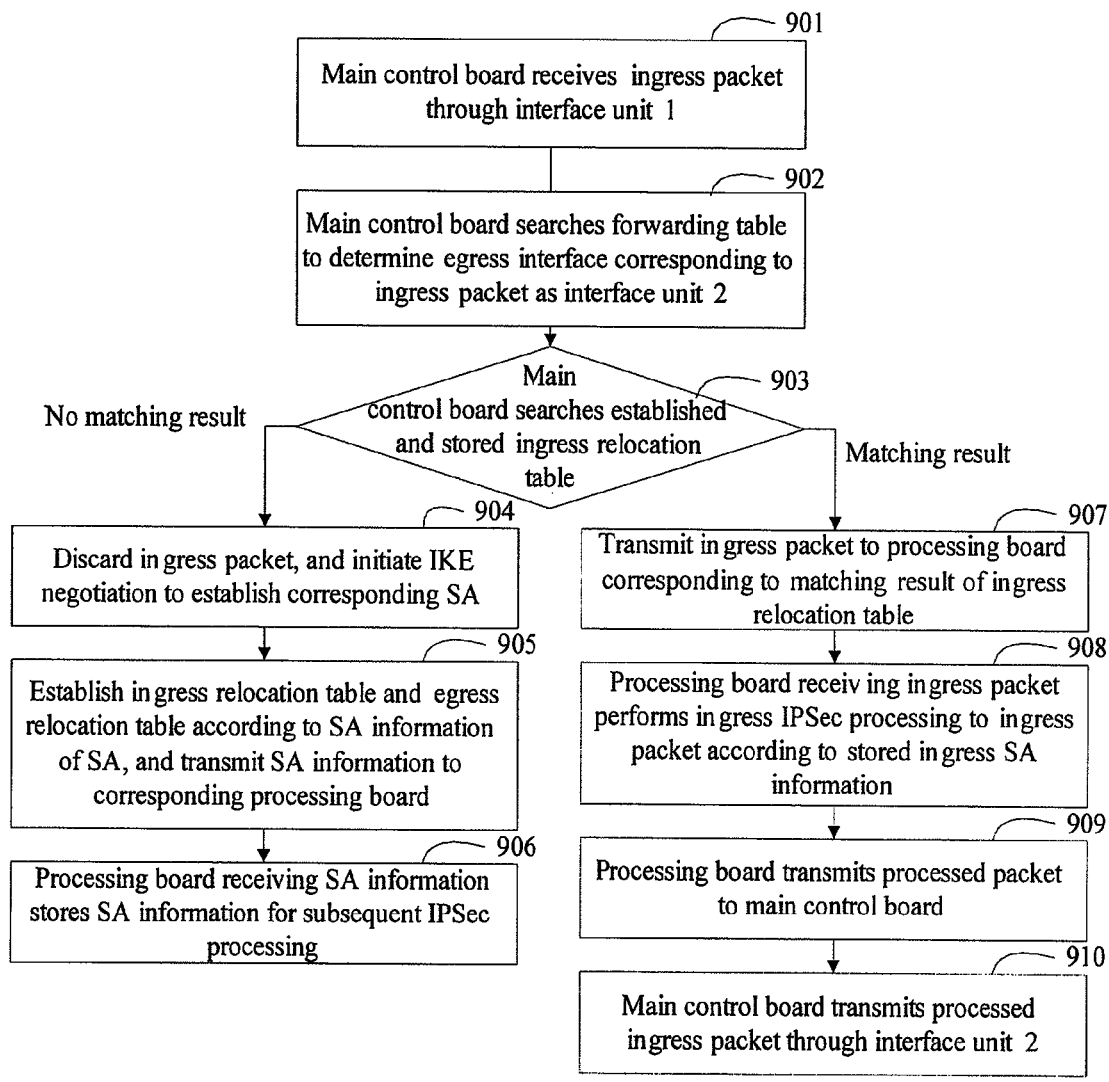
FIG. 9 is a flowchart illustrating a first procedure for ensuring distributed packet transmission security according to an embodiment of the present invention.

FIG. 9 is a flowchart illustrating a first procedure for ensuring distributed packet transmission security according to an embodiment of the present invention. As shown in FIG. 9, the ingress IPSec processing is taken as an example, the procedure of ensuring the ingress distributed packet transmission security according to this embodiment of the present invention includes:

Step 901, the main control board receives an ingress packet through interface unit 1.

Step 902, the main control board searches a forwarding table to determine that an egress interface corresponding to the ingress packet is interface unit 2.

In this step, the egress interface corresponding to the ingress packet is determined according to the interface index obtained by searching the forwarding table. If the allocation manner of the IPSec processing corresponding to the established ingress relocation table is based on the tunnel peer IP, a searching result further includes a next hop IP address of the ingress packet besides the corresponding interface index.

In this step, after determining that the egress interface corresponding to the ingress packet is the interface unit 2, the main control board may find the corresponding security policy according to the quintuplet of the packet received, and determine whether the ingress packet requires corresponding IPSec processing according to the ACL rule in the security policy. If it is determined that the ingress packet requires the IPSec processing, proceed to step 903; otherwise, discard the ingress packet, or relocate the ingress packet to a corresponding processing board through other manners to perform corresponding service processing, and terminate the procedure.

Step 903, the main control board searches the established and stored ingress relocation tables. If no matching result is found, proceed to step 904; otherwise, proceed to step 907.

In this step, no matching result is found means that the keyword obtained from the ingress packet does not match the keywords in any established ingress relocation table.

Step 904, discard the ingress packet, and initiate an IKE negotiation to establish a corresponding SA.

In this step, preferably, it is possible to allocate a unique SA index to the SA of the IPSec tunnel corresponding to the packet, i.e. allocate a unique ingress SA index for the ingress SA and allocate a unique egress SA index for the egress SA.

Step 905, establish an ingress relocation table and an egress relocation table according to SA information of the established corresponding SA, and transmit the SA information to the corresponding processing board.

In this step, the relocation table may be established according to anyone of the above described manners.

In this step, the SA information transmitted to the processing board includes the ingress SA information and the egress information of the same IPSec tunnel, and may also include the SA indexes corresponding to the SA information.

Step 906, the processing board receiving the SA information stores the SA information for subsequent IPSec processing, and terminates the procedure.

Step 907, transmit the ingress packet to the processing board corresponding to the matching result of an ingress relocation table.

In this step, the ingress SA index in the security policy may be transmitted together with the ingress packet to the corresponding processing board.

Step 908, the processing board receiving the ingress packet performs ingress IPSec processing to the ingress packet according to the stored ingress SA information.

In this step, the stored ingress SA information may be found according to the ingress SA index.

Step 909, the processing board transmits the processed packet to the main control board.

Step 910, the main control board transmits the processed ingress packet through the interface unit 2, and terminates the procedure.

As can be seen from the above, as to the ingress packet transmission security protection, the embodiments of the present invention may allocate the ingress IPSec processing corresponding to different ingress SAs to different processing boards and the ingress IPSec processing allocated to different processing boards are not restricted by the interfaces. When there are a large number of IPSec tunnels on the same interface, the ingress IPSec processing to the packet passing the IPSec tunnels will not completely rely on only one interface board. But instead, the ingress IPSec processing is allocated to different processing boards. Thus, multiple processing boards effectively share the ingress IPSec processing corresponding to multiple ingress SAs, which increases the efficiency of the IPSec processing.

Figure 10:
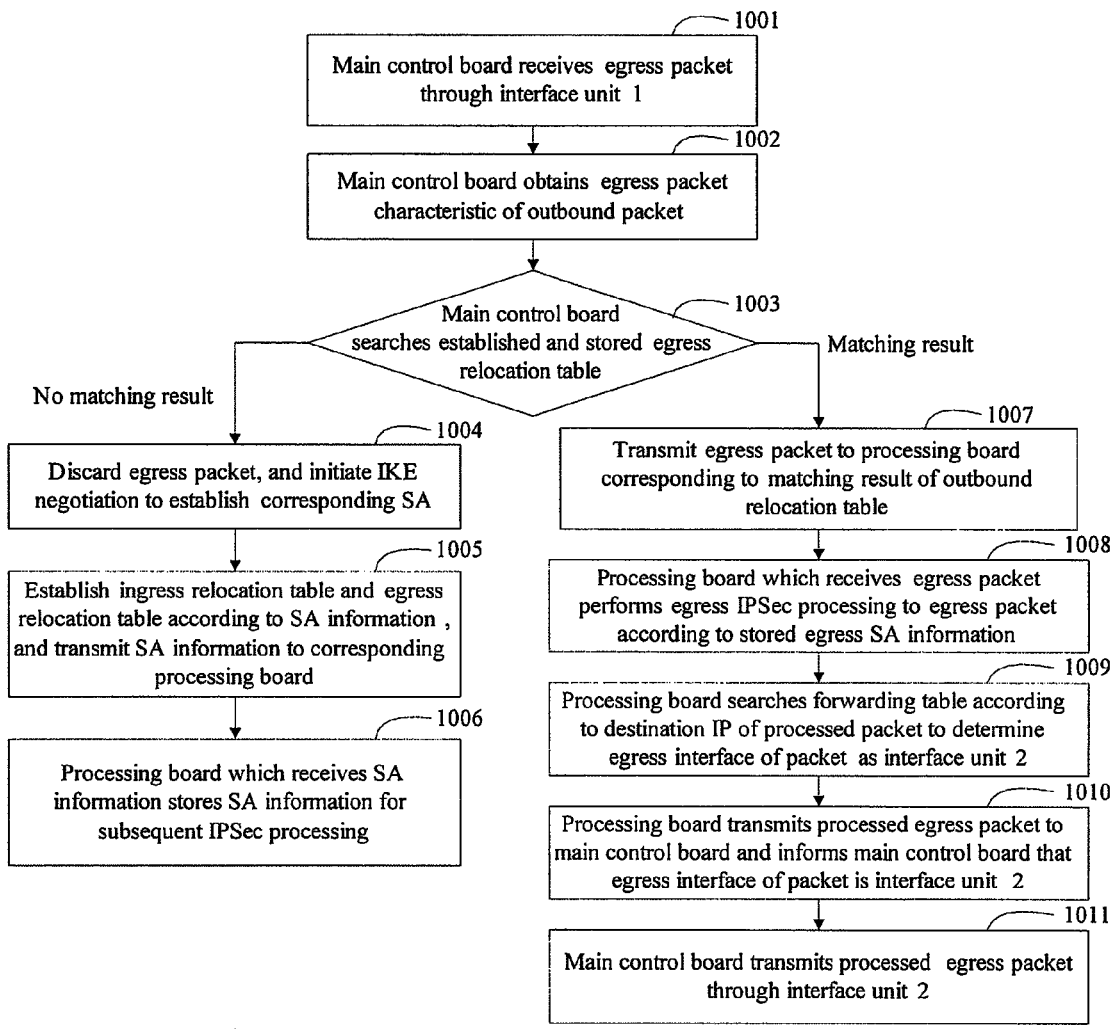
FIG. 10 is a flowchart illustrating a second procedure for ensuring distributed packet transmission security according to an embodiment of the present invention.

FIG. 10 is a flowchart illustrating a second procedure for ensuring distributed packet transmission security according to an embodiment of the present invention. As shown in FIG. 10, the egress IPSec processing is taken as an example, the procedure for ensuring the egress distributed packet transmission security according to this embodiment of the present invention includes:

Step 1001, the main control board receives an egress packet through interface unit 1.

Step 1002, the main control board obtains the egress packet characteristic of the egress packet.

In this step, before obtaining the egress packet characteristic of the egress packet, the main control board firstly determines whether the egress destination IP is the tunnel local IP. If the egress destination IP is the tunnel local IP, the main control board obtains the egress packet characteristic of the egress packet and proceeds to step 1003; otherwise, the main control board discards the packet, or relocates the packet to a corresponding processing board through other manners to perform corresponding service processing, and terminates the procedure.

Step 1003, the main control board searches the established and stored egress relocation tables. If no matching result is found, proceed to step 1004; otherwise, proceed to step 1007.

In this step, no matching result is found means that the keyword obtained from the egress packet does not match the keywords in any established egress relocation table.

Step 1004, discard the egress packet, and initiate an IKE negotiation to establish a corresponding SA.

In this step, it is possible to allocate a unique SA index to the SA of the IPSec tunnel corresponding to the packet, i.e. allocate a unique ingress SA index for the ingress SA and allocate a unique egress SA index for the egress SA.

Step 1005, establish an ingress relocation table and an egress relocation table according to the established SA information, and transmit the SA information to the corresponding processing board.

In this step, the relocation table may be established according to anyone of the methods described above.

In this step, the SA information transmitted to the processing board includes the ingress SA information and the egress SA information of the same IPSec tunnel, and further includes the SA indexes corresponding to the SA information.

Step 1006, the processing board receiving the SA information stores the SA information for subsequent IPSec processing, and terminates the procedure.

Step 1007, transmit the egress packet to the processing board corresponding to the matching result of an egress relocation table.

In this step, the egress SA index in the egress relocation table may be transmitted to the processing board together with the egress packet.

Step 1008, the processing board receiving the egress packet performs egress IPSec processing to the egress packet according to the stored egress SA information.

In this step, the stored egress SA information may be found according to the egress SA index.

Step 1009, the processing board searches a forwarding table according to the destination IP of the processed packet and determines that the egress interface of the packet is the interface unit 2.

Step 1010, the processing board transmits the processed egress packet to the main control board and informs the main control board that the egress interface of the packet is the interface unit 2.

Step 1011, the main control board transmits the processed egress packet through the interface unit 2, and terminates the procedure.

The solution described in steps 1009 to 1011 may also be replaced by: transmitting the processed egress packet to the main control board by the processing board; searching the forwarding table according to the destination IP of the packet by the main control board, determining that the egress interface of the packet is the interface unit 2, and transmitting the packet through the interface unit 2 and terminating the procedure.

Figure 11:
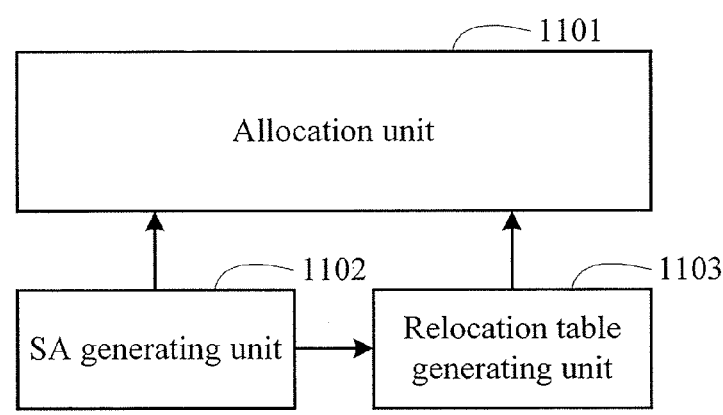
FIG. 11 is a schematic diagram illustrating a structure of a main control board for ensuring packet transmission security according to an embodiment of the present invention.

Based on the above method, embodiments of the present invention also provide a main control board for ensuring packet transmission security. FIG. 11 is a schematic diagram illustrating a structure of the main control board. As shown in FIG. 11, the main control board includes at least an allocation unit 1101, adapted to allocate, if a packet received by an interface unit requires IPSec processing, one of at least one processing board for the packet and forward the packet to the allocated processing board, wherein SA information related to an IPSec tunnel for transmitting the packet requiring the IPSec processing is stored in the allocated processing board.

The main control board further includes an SA generating unit 1102, adapted to establish an SA with respect to each IPSec tunnel, and allocate SA information obtained from establishing the SA to one of the at least one processing board.

The main control board further includes a relocation table generating unit 1103, adapted to generate a relocation table according to the SA information obtained through establishing the SA by the SA generating unit 1102, wherein the relocation table is adapted to record packet characteristic and a processing board identifier corresponding to the packet characteristic.

The allocation unit 1101 is further adapted to search, after receiving the packet requiring the IPSec processing forwarded by the interface unit, the relocation table to obtain the processing board identifier corresponding to the packet characteristic of the packet, transmit the packet requiring the IPSec processing to the processing board identified by the processing board identifier found from the relocation table.

The allocation unit 1101 is further adapted to search the forwarding table, and forward the packet from the processing board to the interface unit used for transmitting the packet.

The embodiments of the present invention also provide a main control board for ensuring packet transmission security. The main control board at least includes an allocation unit. When receiving a packet forwarded by an interface unit, the allocation unit allocates one of at least one processing board to the packet, and forward the packet to the allocated processing board, wherein SA information related to an IPSec tunnel for transmitting the packet requiring the IPSec processing is stored in the allocated processing board.

It can be seen from the above that, as to the egress packet transmission security protection, embodiments of the present invention can allocate the IPSec processing corresponding to different egress SAs to different processing boards. The egress IPSec processing allocated to different processing boards is not limited to interfaces. When there are a large number of IPSec tunnels on an interface, the egress IPSec processing of the packets passing the IPSec tunnels will not completely rely on only one interface board. Instead, the IPSec processing will be allocated to different processing boards. Thus, the multiple processing boards effectively share the egress IPSec processing corresponding to multiple egress SAs, which increases the efficiency of the IPSec processing.

The foregoing descriptions are only preferred embodiments of this invention and are not for use in limiting the protection scope thereof. Any changes and modifications can be made by those skilled in the art without departing from this invention and therefore should be covered within the protection scope as set by the appended claims.

The invention claimed is:

1. An apparatus for ensuring packet transmission security, comprising:
   a main control board, at least one interface unit and at least one processing board, wherein the at least one interface unit is adapted to forward at least one packet to the main control board;
   the main control board is adapted to allocate, when receiving a packet forwarded by the at least one interface unit requiring Internet Protocol Security (IPSec) processing, one processing board of the at least one processing board to the packet, and forward the packet requiring the IPSec processing to the allocated processing board, wherein Security Association (SA) information related to an IPSec tunnel for transmitting the packet requiring the IPSec processing is stored in the processing board allocated; and
   the one of the at least one processing board is adapted to perform the IPSec processing to the packet requiring the IPSec processing received from the main control board according to the stored SA information, wherein the at least one interface unit is configured with at least one IPSec tunnel; and
   the main control board is further adapted to establish an SA with respect to each IPSec tunnel, and generate a relocation table according to the SA information obtained, wherein the relocation table is used for recording packet characteristic and a processing board identifier corresponding to the packet characteristic; search for, when receiving the packet requiring IPSec processing forwarded by the interface unit, a relocation table which records the same packet characteristic with that of the packet requiring the IPSec processing, and transmit the packet to a processing board identified by the processing board identifier recorded in the found relocation table.

2. The apparatus of claim 1, wherein
   the main control board is further adapted to allocate SA information obtained from establishing the SA to one processing board of the at least one processing board; and
   the SA stored in the processing board is the SA information allocated by the main control board.

3. The apparatus of claim 1, wherein the packet characteristic is ingress packet characteristic and comprises:
   an interface index in the SA information and a quintuplet found from a pre-defined Access Control List (ACL) table according to an ACL rule number in the SA information; or
   the interface index in the SA information; or
   a tunnel peer IP and the interface index in the SA information; or
   an SA protected flow quintuplet and the interface index in the SA information;
   wherein the interface index is obtained through searching a pre-defined forwarding table according to a destination IP in an ingress packet received.

4. The apparatus of claim 1, wherein the packet characteristic is egress packet characteristic and comprises: a security index, a tunnel local IP and a security protocol type in the SA information.

5. The apparatus of anyone of claim 2, wherein the processing board is further adapted to transmit the processed packet to the main control board;
   the main control board is further adapted to search a forwarding table, and forward the processed packet from the processing board to an interface unit which is used for transmitting the packet; and
   the interface unit is adapted to transmit the processed packet received from the main control board.

6. The apparatus of claim 5, wherein the interface unit is a physical interface on the main control board, or a functional unit independent from the main control board.

7. The apparatus of claim 5, wherein the main control board, the processing board and the interface board are located in a same physical entity; or
   any two of the main control board, the processing board and the interface unit are located in different physical entities.

8. The apparatus of claim 5, wherein the apparatus for ensuring the packet transmission security is a gateway.

9. An apparatus for ensuring packet transmission security, comprising:
   a main control board, at least one interface unit and at least one processing board, wherein the at least one interface unit is adapted to forward at least one packet to the main control board;
   the main control board is adapted to allocate one processing board of the at least one processing board to the packet when receiving the packet forwarded by the at least one interface unit, and forward the packet to the allocated processing board, wherein SA information stored by the processing board is related to an Internet Protocol Security (IPSec) tunnel transmitting the packet; and
   the one of the at least one processing board is adapted to perform IPSec processing to the packet received from the main control board according to the stored SA information, wherein the at least one interface unit is configured with at least one IPSec tunnel; and the main control board is further adapted to establish an SA with respect to each IPSec tunnel, and generate a relocation table according to the SA information obtained, wherein the relocation table is used for recording packet characteristic and a processing board identifier corresponding to the packet a characteristic; search for, when receiving the packet requiring IPSec processing forwarded by the interface unit, a relocation table which records the same packet characteristic with that of the packet requiring the IPSec processing, and transmit the packet to a processing board identified by the processing board identifier recorded in the found relocation table.

10. A main control board for ensuring packet transmission security, comprising:

an allocation unit, adapted to allocate, when receiving from an interface unit a packet requiring Internet Protocol Security (IPSec) processing, one processing board of at least one processing board for the packet requiring the IPSec processing, and forward the packet requiring the IPSec processing to the allocated processing board, wherein the processing board stores Security Association (SA) information related to an IPSec tunnel for transmitting the packet requiring the IPSec processing;

a SA generating unit, adapted to establish an SA with respect to each IPSec tunnel; and a relocation table generating unit, adapted to generate a relocation table according to the SA information obtained, wherein the relocation table is used for recording packet characteristic and a processing board identifier corresponding to the packet characteristic; and the allocation unit is further adapted to search the relocation table when receiving the packet requiring the IPSec processing forwarded by the interface unit to obtain the processing board identifier corresponding to the packet characteristic of the packet received, and transmit the packet to the processing board corresponding to the found processing board identifier.

11. The main control board of claim 10, comprising:
the SA generating unit, further adapted to allocate SA information obtained from establishing the SA to one of the at least one processing board.

12. The main control board of claim 10, wherein the allocation unit is further adapted to search a forwarding table, and forward the processed packet from the processing board to an interface unit which is used for transmitting the packet.

13. A method for ensuring packet transmission security, applied to an apparatus for ensuring packet transmission security comprising a main control board, at least one interface unit and at least one processing board, comprising:

when receiving a packet requiring Internet Processing Security (IPSec) processing forwarded by the interface unit, allocating by the main control board one of the at least one processing board to the packet requiring the IPSec processing;

forwarding by the main control board the packet requiring the IPSec processing to the allocated processing board, wherein Security Association (SA) information related to an IPSec tunnel for transmitting the packet requiring the IPSec processing is stored in the allocated processing board;

performing, by the allocated processing board, the IPSec processing to the packet received from the main control board according to the stored SA information;

establishing an SA with respect to each IPSec tunnel; and generating a relocation table according to the SA information obtained, wherein the relocation table is used for recording packet characteristic and a processing board identifier corresponding to the packet characteristic;

wherein the forwarding the packet requiring the IPSec processing to one of the at least one processing board comprises:

when receiving the packet requiring the IPSec processing forwarded by the interface unit, searching for a relocation table which records the same packet characteristic as that of the packet requiring the IPSec processing, and transmitting the packet to a processing board identified by the processing board identifier recorded in the found relocation table.

14. The method of claim 13, further comprising:
allocating SA information obtained from establishing the SA to one of the at least one processing board.

15. The method of claim 13, wherein the establishing the relocation table according to the SA information comprises:
determining the packet characteristic according to the SA information; and
establishing a mapping relationship between the packet characteristic and the processing board identifier.

16. The method of claim 15, wherein the SA comprises an ingress SA and an egress SA of an IPSec tunnel, and the establishing the relocation table according to the SA information comprises: establishing an ingress relocation table according to SA information of the ingress SA, and establishing an egress relocation table according to SA information of the egress SA;

if the packet requiring the IPSec processing is an ingress packet, the searching for a relocation table which records the same packet characteristic as that of the packet requiring the IPSec processing and the transmitting the packet to the processing board identified by the processing board identifier recorded in the found relocation table comprise: searching for an ingress relocation table which records the same packet characteristic as that of the packet requiring the IPSec processing, and transmitting the packet to the processing board identified by the processing board identifier recorded in the found ingress relocation table; and if the packet requiring the IPSec processing is an egress packet, the searching for a relocation table which records the same packet characteristic as that of the packet requiring the IPSec processing and the transmitting the packet to the processing board identified by the processing board identifier recorded in the found relocation table comprise: searching for an egress relocation table which records the same packet characteristic as that of the packet requiring the IPSec processing, and transmitting the packet to the processing board identified by the processing board identifier recorded in the found egress relocation table.

17. The method of claim 16, wherein the packet requiring the IPSec processing is the ingress packet;

when establishing the ingress relocation table according to the SA information in the ingress SA, the packet characteristic recorded in the ingress relocation table comprises: an interface index in the SA information and a quintuplet found from a pre-defined ACL table according to an ACL rule number in the SA information; and the searching for the ingress relocation table which records the same packet characteristic as that of the packet requiring the IPSec processing comprises: searching a pre-defined forwarding table according to a destination IP of the packet requiring the IPSec processing to determine an interface index corresponding to the packet requiring the IPSec processing; comparing all or some elements of the quintuplet of the packet requiring the IPSec processing and the interface index corresponding to the packet with packet characteristic recorded in each ingress relocation table to obtain the ingress relocation table which records all or some elements of the quintuplet of the packet requiring the IPSec processing and the interface index corresponding to the packet; or, when establishing the ingress relocation table according to the SA information of the ingress SA, the packet characteristic recorded by the ingress relocation table comprises: the interface index in the SA information; and the searching for the ingress relocation table which records the same packet characteristic as that of the packet requiring the IPSec processing comprises: searching a pre-defined forwarding table according to a destination IP of the packet requiring the IPSec processing to determine the interface index corresponding to the packet requiring the IPSec processing, comparing the interface index corresponding to the packet requiring the IPSec processing with the packet characteristic recorded in each ingress relocation table to obtain the ingress relocation table which records the interface index corresponding to the packet requiring the IPSec processing; or, when establishing the ingress relocation table according to the SA information in the ingress SA, the packet characteristic recorded in the ingress relocation table comprises: a tunnel peer IP and the interface index in the SA information; and the searching for the ingress relocation table which records the same packet characteristic as that of the packet requiring the IPSec processing comprises: searching the pre-defined forwarding table according to the destination IP of the packet requiring the IPSec processing to determine the interface index and the tunnel peer IP corresponding to the packet requiring the IPSec processing, comparing the tunnel peer IP of the packet requiring the IPSec processing and the interface index corresponding to the packet requiring the IPSec processing with the packet characteristic recorded by each ingress relocation table to obtain the ingress relocation table which records the tunnel peer IP of the packet requiring the IPSec processing and the interface index corresponding to the packet requiring the IPSec processing; or, when establishing the ingress relocation table according to the SA information in the ingress SA, the packet characteristic recorded in the ingress relocation table comprises: SA protected flow quintuplet and the interface index in the SA information; and the searching for the ingress relocation table which records the same packet characteristic as that of the packet requiring the IPSec processing comprises: searching the pre-defined forwarding table according to the destination IP of the packet requiring the IPSec processing to determine the interface index corresponding to the packet requiring the IPSec processing, comparing all or some elements in the quintuplet of the packet requiring the IPSec processing and the interface index corresponding to the packet with the packet characteristic recorded in each ingress relocation table to obtain the ingress relocation table which records all or some elements of the quintuplet of the packet requiring the IPSec processing and the interface index corresponding to the packet requiring the IPSec processing.

18. The method of claim 16, wherein the packet requiring the IPSec processing is the egress packet;

when establishing the egress relocation table according to the SA information in the egress SA, the packet characteristic recorded in the egress relocation table comprises: an interface index, a tunnel local IP and a security protocol type in the SA information; and the searching for the egress relocation table which records the same packet characteristic as that of the packet requiring the IPSec processing comprises: comparing the security index, the tunnel local IP and the security protocol type in the packet requiring the IPSec processing with the packet characteristic recorded in each egress relocation table to obtain the egress relocation table which records the security index, the tunnel local IP and the security protocol type of the packet requiring the IPSec processing.

19. The method of claim 17, further comprising: establishing an ingress SA index and an egress SA index respectively for the ingress SA and the egress SA;

wherein the transmitting the SA information obtained from establishing the SA to at least one processing board comprises:

transmitting the SA information of the ingress SA and the SA information of the egress SA of a same IPSec tunnel together with the ingress SA index and the egress SA index to a same processing board;

wherein the transmitting the packet requiring the IPSec processing to the processing board identified by the processing board identifier comprises:

transmitting the packet requiring the IPSec processing and a corresponding SA index to the processing board identified by the processing board identifier;

wherein, before the processing board performs the IPSec processing to the packet from the main control board according to the stored SA information, the method further comprises:

obtaining, by the processing board, the stored SA information according to the corresponding SA index received.

20. The method of claim 19, wherein the processing board identifier is a processing board number, and the method further comprises:

determining a processing board number in the ingress relocation table according to a mod of the number of ingress relocation tables and the number of processing boards; and configuring a processing board number in the egress relocation table to be the same as that in the ingress relocation table.

21. The method of claim 20, further comprising:

chin the forwarding table: and transmitting the processed packet from the processing board to the interface unit which is used for transmitting the packet.

* * * * *

UNITED STATES PATENT AND TRADEMARK OFFICE
CERTIFICATE OF CORRECTION

| | |
|---|---|
| PATENT NO. | : 8,392,701 B2 |
| APPLICATION NO. | : 12/672178 |
| DATED | : March 5, 2013 |
| INVENTOR(S) | : Xiangqing Chang et al. |

It is certified that error appears in the above-identified patent and that said Letters Patent is hereby corrected as shown below:

In the Claims

In column 20, line 31, in Claim 5, after "apparatus" delete "of anyone".

In column 21, line 8, in Claim 9, after "packet" delete "a".

In column 24, line 57, in Claim 21, delete "chin" and insert -- searching --, therefor.

In column 24, line 57, in Claim 21, delete "table:" and insert -- table, --, therefor.

Signed and Sealed this
Sixth Day of August, 2013

Teresa Stanek Rea
*Acting Director of the United States Patent and Trademark Office*